Figure 1:
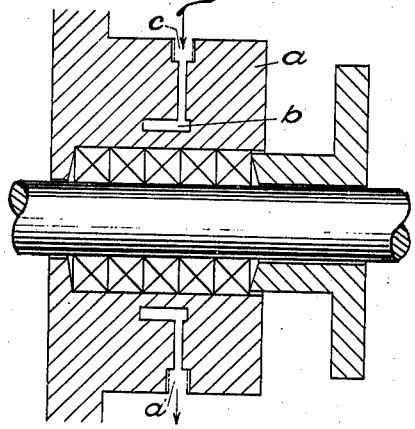

Oct. 4, 1938.    W. WENZEL    2,131,927

STUFFING BOX FOR LIQUID PUMPS

Filed Nov. 16, 1935

INVENTOR
Wilhelm Wenzel
BY
ATTORNEYS

Patented Oct. 4, 1938

2,131,927

UNITED STATES PATENT OFFICE 2,131,927

STUFFING BOX FOR LIQUID PUMPS

Wilhelm Wenzel, Leuna, Germany, assignor to I. G. Farbenindustrie Aktiengesellschaft, Frankfort-on-the-Main, Germany Application November 16, 1935, Serial No. 50,115
In Germany November 23, 1934

2 Claims. (Cl. 286—27)

This invention relates to stuffing boxes for liquid pumps and more particularly for pumps for liquefied gases or other readily vaporizable liquids.

In the conveyance of readily vaporizable liquids of low boiling point, in particular of liquefied gases, as for example liquefied propane or butane or mixtures of the same, by means of piston or turbine pumps, the stuffing boxes frequently cause trouble in operation by becoming leaky too rapidly. By reason of the fact that a stuffing box cannot in practice be entirely tight without causing the packing to become hot, a certain amount of liquid always penetrates between the piston or shaft and the packing material. This amount of liquid, hereinafter referred to as the trickle liquid, vaporizes or passes into the gaseous phase and is released from pressure whereby the necessary amount of heat is withdrawn from the packing material and the metallic parts surrounding it. The packing material thereby loses its elastic properties. It becomes hard and within a short time the leakage of the packing increases to such an extent as to render a regulated further operation of the process impossible.

I have now found that the said drawback is avoided by supplying the amount of heat necessary for the evaporation and releasing from pressure of the trickle liquid from outside the stuffing box to the place at which the evaporation or releasing from pressure of the trickle liquid takes place. The packing material thus loses no heat by the vaporization and releasing from pressure of the trickle liquid but on the contrary substantially maintains its original temperature and therefore its elastic properties.

The supplying of the necessary amount of heat to the stuffing box may be effected in different ways depending on the shape and manner of operation of the machine as well as on the nature of the material to be conveyed. Thus for example the material of the stuffing box may be provided with heating chambers or channels through which the heating agent, as for example steam, hot water or hot oil, is led. Similarly, one or more packing rings may be replaced by hollow rings through which the heating agent flows. Alternatively, the shaft or piston of the machine may be provided with borings and the heat supplied to the stuffing box in this way. Electrical heating elements may also be employed. In some cases it is advantageous to effect the supply of heat by the simultaneous employment of several of the said or similar means. Preferably the flow of heat from the stuffing box to other parts of the pump is stopped by a suitable heat insulation of the housing of the stuffing box.

The nature of this invention will be further described with reference to the accompanying drawing which shows diagrammatically by way of example means of supplying heat to stuffing boxes in accordance with this invention but the invention is not restricted to the particular arrangements shown.

Referring to Figure 1, the housing *a* of the stuffing box is provided with a flat annular channel *b*. The heating agent is supplied at *c*, flows through the annular space *b* and leaves the stuffing box housing *a* at *d* after it has given up the whole or a part of its heat.

Figure 2:
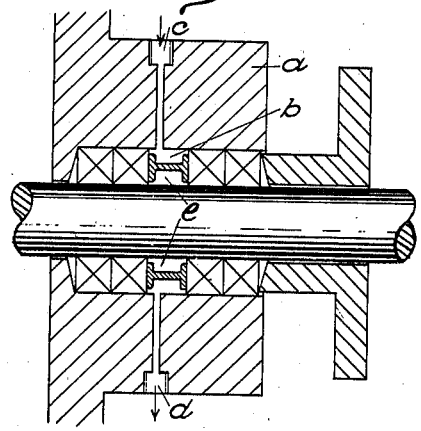

Referring to Figure 2, an H-shaped ring is interposed between the packing and forms two hollow spaces *b* and *e*. The heating agent is supplied at *c*, flows while giving up heat through the outer hollow space *b* and leaves at *d*. The vaporization of the trickle liquid in this modification mainly takes place in the inner hollow space *e*.

Figure 2A:
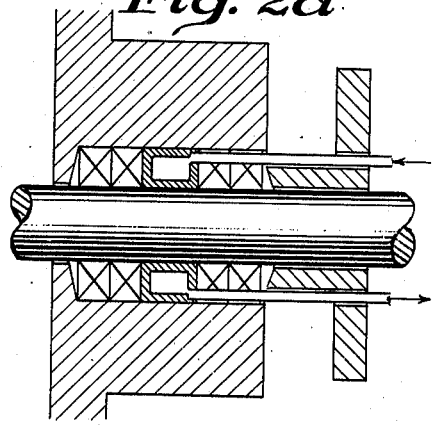

Referring to Figure 2*a* a simple hollow ring is substituted for the H-shaped ring of Figure 2. The heating agent flows through this hollow ring. The heating agent is supplied and withdrawn parallel to the shaft through appropriate orifices in the packing.

Figure 3:
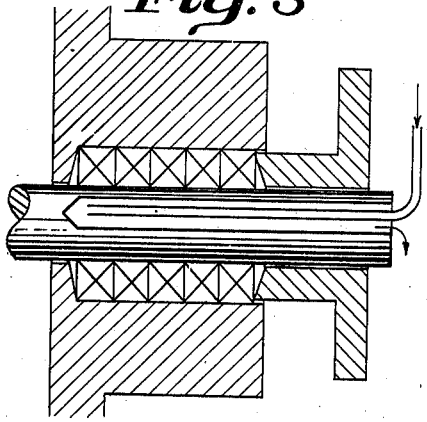

Referring to Figure 3, the supply of heat is effected through the shaft itself which for this purpose is provided with a corresponding boring through which the heating agent flows.

Figure 4:
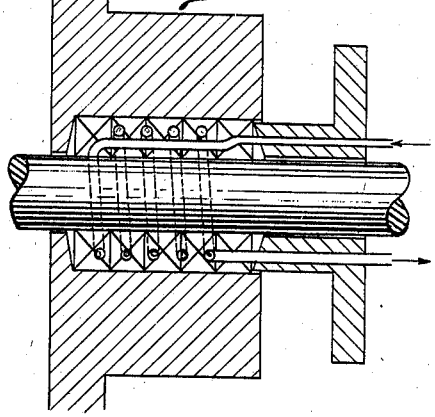

Referring to Figure 4, the supply of heat is effected through a heating coil embedded in the packing through which the heating agent is led.

What I claim is:—

1. A process of preventing the trickle liquid which flows between the stuffing box and the part of an apparatus operating on a readily vaporizable liquid in contact with said stuffing box from impairing the packing of said box which comprises supplying heat from a flowing heating fluid to the zone of contact between said stuffing box and said apparatus part in an amount sufficient to cause vaporization of said trickle liquid and confining said heating fluid so that it does not mingle with said trickle liquid.

2. A process of preventing the trickle liquid which flows between the stuffing box and the part of an apparatus operating on a readily vaporizable liquid in contact with said stuffing box from impairing the packing of said box which comprises supplying heat from outside the stuffing box to the zone of contact between said stuffing box and said apparatus part in an amount sufficient to cause vaporization of said trickle liquid.

WILHELM WENZEL.